(12) United States Patent
Rattray et al.

(10) Patent No.: US 8,982,100 B2
(45) Date of Patent: Mar. 17, 2015

(54) INTERACTIVE INPUT SYSTEM AND PANEL THEREFOR

(75) Inventors: Robbie Rattray, Calgary (CA); David Popovich, Calgary (CA)

(73) Assignee: SMART Technologies ULC (CA)

( * ) Notice: Subject to any disclaimer, the term of this patent is extended or adjusted under 35 U.S.C. 154(b) by 244 days.

(21) Appl. No.: 13/601,387

(22) Filed: Aug. 31, 2012

(65) Prior Publication Data

US 2013/0050149 A1 Feb. 28, 2013

Related U.S. Application Data

(60) Provisional application No. 61/529,259, filed on Aug. 31, 2011.

(51) Int. Cl.
*G06F 3/042* (2006.01)

(52) U.S. Cl.
CPC .... *G06F 3/0425* (2013.01); *G06F 2203/04109* (2013.01)
USPC ............................ 345/175; 345/173; 345/176

(58) Field of Classification Search
CPC ............................................. G06F 2203/04109
USPC ................................................. 345/156–179
See application file for complete search history.

(56) References Cited

U.S. PATENT DOCUMENTS

| | | |
|---|---|---|
| 5,448,263 A | 9/1995 | Martin |
| 6,141,000 A | 10/2000 | Martin |
| 6,337,681 B1 | 1/2002 | Martin |
| 6,747,636 B2 | 6/2004 | Martin |
| 6,803,906 B1 | 10/2004 | Morrison et al. |
| 7,232,986 B2 | 6/2007 | Worthington et al. |
| 7,236,162 B2 | 6/2007 | Morrison et al. |
| 7,274,356 B2 | 9/2007 | Ung et al. |
| 2008/0150913 A1 | 6/2008 | Bell |
| 2008/0179507 A2 | 7/2008 | Han |
| 2009/0219253 A1 | 9/2009 | Izadi et al. |
| 2010/0079409 A1 | 4/2010 | Sirotich et al. |
| 2010/0188340 A1* | 7/2010 | Smoot ........................... 345/173 |
| 2011/0050650 A1 | 3/2011 | McGibney et al. |
| 2011/0221705 A1* | 9/2011 | Yi et al. ......................... 345/175 |
| 2012/0038590 A1* | 2/2012 | Kim et al. ..................... 345/175 |

* cited by examiner

*Primary Examiner* — Temesgh Ghebretinsae
*Assistant Examiner* — Lisa Landis
(74) *Attorney, Agent, or Firm* — Katten Muchin Rosenman LLP

(57) ABSTRACT

An interactive panel comprises an optical waveguide within which totally internally reflected (TIR) illumination propagates, a display device beneath the optical waveguide and a partially transparent layer beneath the display device. The partially transparent layer reflects backlight illumination towards the display device and at least allows TIR illumination escaping from the optical waveguide and passing through the optical waveguide and the display panel, as a result of one or more contacts made on the optical waveguide, to pass therethrough.

30 Claims, 10 Drawing Sheets

INTERACTIVE INPUT SYSTEM AND PANEL THEREFOR

CROSS-REFERENCE TO RELATED APPLICATION

This application claims the benefit of U.S. Provisional Application No. 61/529,259 to Rattray, et al., filed on Aug. 31, 2011, the entire disclosure of which is incorporated herein by reference.

FIELD OF THE INVENTION

The present invention relates to an interactive input system and panel therefor.

BACKGROUND OF THE INVENTION

Interactive input systems that allow users to inject input (e.g., digital ink, mouse events etc.) into an application program using an active pointer (e.g., a pointer that emits light, sound or other signal), a passive pointer (e.g., a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the entire disclosures of which are incorporated by reference; touch systems comprising touch panels employing electromagnetic, capacitive, acoustic or other technologies to register pointer input; tablet and laptop personal computers (PCs); personal digital assistants (PDAs) and other handheld devices; and other similar devices.

Above-incorporated U.S. Pat. No. 6,803,906 to Morrison, et al. discloses a touch system that employs machine vision to detect pointer interaction with a touch surface on which a computer-generated image is presented. A rectangular bezel or frame surrounds the touch surface and supports imaging devices in the form of digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Multi-touch interactive input systems that receive and process input from multiple pointers are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide, causing some light to escape from the waveguide at the touch point. The multi-touch interactive input system employs machine vision to capture images including the light that escapes the waveguide at each touch point, and processes the images to identify the position of the pointers relative to the waveguide surface based on the escaped light.

U.S. Patent Application Publication No. 2011/0050650 to McGibney, et al., assigned to SMART Technologies ULC, discloses an interactive input system with improved signal-to noise ratio and image capture method. The interactive input system comprises an optical waveguide associated with a display having a top surface with a diffuser for displaying images projected by a projector and also for contact by an object, such as a finger. The interactive input system also includes two light sources. Light from a first light source is coupled into the optical waveguide and undergoes total internal reflection within the waveguide. Light from a second light source is directed towards a back surface of the waveguide opposite to its top surface. At least one imaging device, such as a camera, has a field of view looking at the back surface of the waveguide and captures image frames in a sequence with the first light source and the second light source on and off alternately. Pointer interactions with the top surface of the waveguide can be recorded as handwriting or drawing to control execution of an application program.

U.S. Patent Application Publication No. 2008/0179507 to Han discloses a multi-touch sensing display system employing a liquid crystal display (LCD) panel disposed between an optical waveguide and an imaging sensor. The LCD panel is adapted/designed to be transparent to infrared light so that infrared light injected into the optical waveguide by an LED light source escapes the optical waveguide and is imaged by the imaging sensor. Contacts on the optical waveguide can be detected.

U.S. Patent Application Publication No. 2008/0150913 to Bell discloses an interactive video display system including a transparent flat LCD panel beneath a transparent pane, a camera under the LCD panel and an illuminator that illuminates the transparent pane. The LCD panel is at least partially transparent to light visible to the camera. When an object is touching the transparent pane, light in the transparent pane is able to scatter, allowing it to escape the confines of the transparent pane. Interaction of the object with the touch surface of the transparent pane is then able to be detected by the camera under the LCD panel.

U.S. Patent Application Publication No. 2009/0219253 to Izadi, et al. discloses an interactive surface computer including an LCD panel with a switchable diffuser. The switchable diffuser replaces the typical fixed diffuser layer of the LCD panel and has two states, namely a transparent state and a diffusing state. When the switchable diffuser is in the diffusing state, IR sensors beneath the LCD panel can detect objects which are very close to the touch surface. When the switchable diffuser is in the transparent state, objects which are at a greater distance from the touch surface can be detected by another imaging sensor.

Although LCD panels have been employed in FTIR touch technology, improvements are desired. It is therefore an object of the present invention to provide a novel interactive input system and panel therefor.

SUMMARY OF THE INVENTION

Accordingly, in one aspect there is provided an interactive panel comprising an optical waveguide within which totally internally reflected (TIR) illumination propagates; a display device beneath said optical waveguide; and a partially transparent layer beneath said display device, said partially transparent layer reflecting backlight illumination towards said display device and at least allowing TIR illumination escaping from said optical waveguide and passing through said optical waveguide and display device, as a result of one or more contacts made on said optical waveguide, to pass therethrough.

In one embodiment, the interactive panel further comprises a backlight layer between the display device and the partially transparent layer, the backlight layer directing backlight illumination to the display panel and the partially transparent layer. In one embodiment, the partially transparent layer is at least one film or coating applied to the undersurface of the backlight layer. In another embodiment, the partially transparent layer is supported beneath the backlight layer by a generally transparent support layer. In one form, the partially transparent layer is perforated. The partially transparent layer may comprise overlapping perforated films with the perforations in the films partially aligning.

In one embodiment, the interactive panel further comprises an illumination source directing illumination having an optical property different than the backlight illumination into the optical waveguide that is totally internally reflected therein. For example, the illumination source may be an infrared illumination source. The interactive panel may also comprise a backlight illumination source directing backlight illumination into the backlight layer. The display device may be a liquid crystal display panel or other similar display.

According to yet another aspect there is provided an interactive input system comprising an interactive panel comprising at least one optical waveguide within which totally internally reflected (TIR) illumination propagates; at least one display device beneath said at least one optical waveguide; and at least one partially transparent layer beneath said at least one display device, said at least one partially transparent layer reflecting backlight illumination towards said at least one display device and at least allowing TIR illumination escaping from said at least one optical waveguide and passing through said at least one optical waveguide and at least one display device, as a result of one or more contacts made on said at least one optical waveguide, to pass therethrough; and at least one imaging device capturing image frames comprising TIR illumination passing through said at least one partially transparent layer.

In one embodiment, the interactive input system further comprises processing structure processing image frames captured by the imaging device to detect contacts made on the optical waveguide. The processing structure may further provide image data to the display panel.

According to still yet another aspect there is provided an interactive panel comprising an optical waveguide within which totally internally reflected (TIR) illumination propagates; a plurality of display panels beneath said optical waveguide; and at least one partially transparent layer beneath said display panels, said at least one partially transparent layer reflecting backlight illumination towards said display panels and allowing TIR illumination escaping from said optical waveguide and passing through said optical waveguide and one or more of said display panels, as a result of one or more contacts made on said optical waveguide, to pass therethrough.

According to still yet another aspect there is provided an interactive input system comprising an interactive panel comprising an optical waveguide within which totally internally reflected (TIR) illumination propagates; a plurality of display panels beneath said optical waveguide; and at least one partially transparent layer beneath said display panels, said at least one partially transparent layer reflecting backlight illumination towards said display panels and allowing TIR illumination escaping from said optical waveguide and passing through said optical waveguide and one or more of said display panels, as a result of one or more contacts made on said optical waveguide, to pass therethrough; and at least one imaging device capturing image frames comprising TIR illumination passing through each said partially transparent layer.

BRIEF DESCRIPTION OF THE DRAWINGS

Embodiments will now be described more fully with reference to the accompanying drawings in which.

DETAILED DESCRIPTION OF THE EMBODIMENTS

Figure 1:
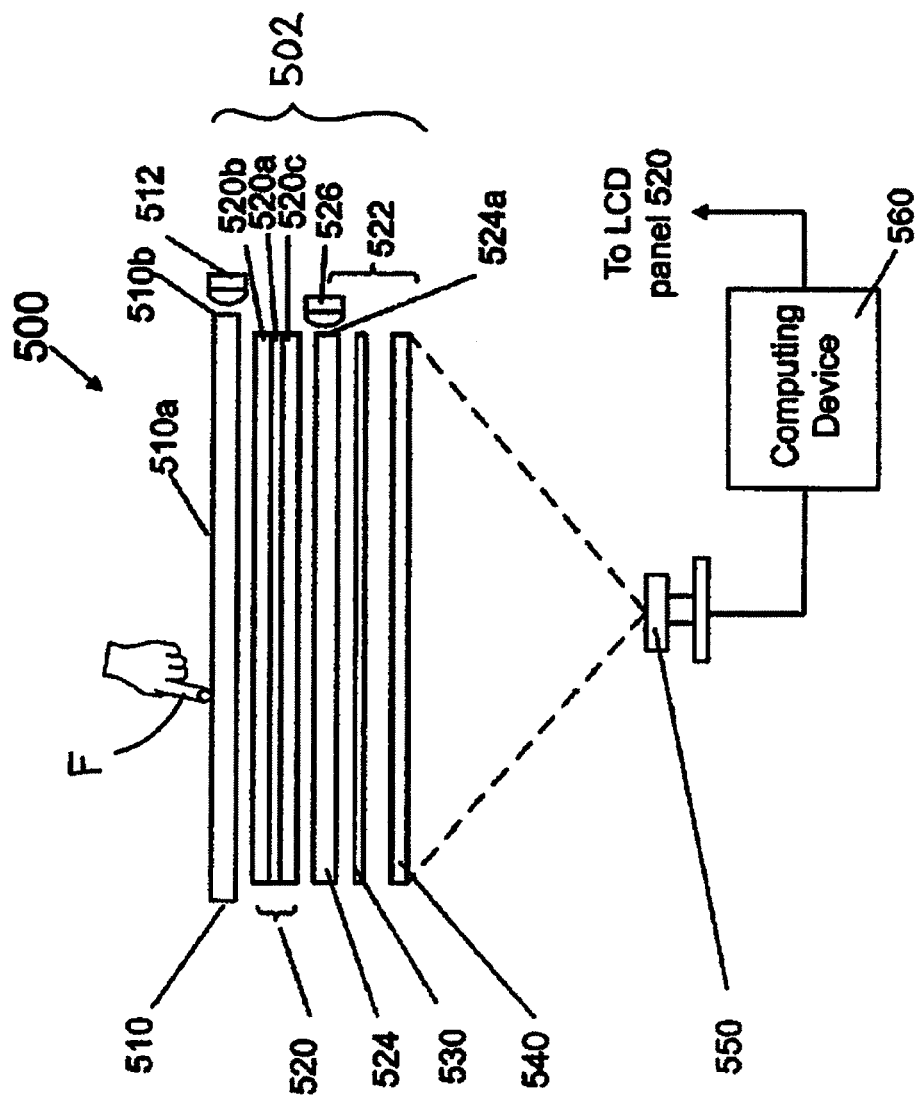
FIG. 1 is a schematic, exploded, side elevational view of an interactive input system.

Turning now to FIG. 1, an interactive input system is shown and is generally identified by reference numeral 500. As can be seen, interactive input system 500 in this example comprises an interactive panel 502. Interactive panel 502 comprises a generally transparent optical waveguide 510 formed of glass, plastic or other suitable light transmissive material. The upper surface of the optical waveguide 510 defines an input surface 510a on which one or more pointer contacts can be made using a pointer such as for example a user's finger F, a stylus, a pen tool, an eraser tool or other suitable object. An infrared (IR) illumination source 512 is positioned to one side 510b of the optical waveguide 510 and directs or couples IR illumination into the optical waveguide 510. The IR illumination entering the optical waveguide 510 is trapped and propagates therein as a result of total internal reflection (TIR). In this embodiment, the IR illumination 512 source comprises an array or bank of IR light emitting diodes (LEDs) extending along side 510b of the optical waveguide 510.

A generally flat, generally transparent display device such as for example, a liquid crystal display (LCD) panel 520 on which an image is presented, is positioned below the optical waveguide 510. The image presented by the LCD panel 520 is visible through the optical waveguide 510 when looking at the input surface 510a. In this manner, users can interact with the displayed image by contacting the input surface 510*a*. A stack 522 of layers is disposed beneath the LCD panel 520. In this embodiment, the stack 522 of layers comprises a backlight layer 524 formed of acrylate such as for example polymethylmethacrylate (PMMA) or other suitable light guiding material, a partially transparent layer 530 below the backlight layer 524, and a generally transparent support layer 540 formed of acrylic or other suitable material below the partially transparent layer 530. A backlight illumination source 526 is positioned to one side 524*a* of the backlight layer 524 and directs or couples visible backlight illumination into the backlight layer 524. An imaging device 550 is positioned beneath the stack 522 of layers and is oriented so that its field of view encompasses the support layer 540. An IR pass filter (not shown) is provided on the imaging device 550 so that the image sensor of the imaging device 550 is only exposed to illumination in the IR frequency band.

The LCD panel 520 comprises a liquid crystal layer 520*a* sandwiched between upper and lower substrates 520*b* and 520*c*, respectively, each comprising an electrode and a polarizer. A color filter is provided on the upper substrate 520*b*. The backlight illumination source 526 in this embodiment is either a cold cathode fluorescent lamp (CCFL) or an array of white light emitting diodes (LEDs) arranged along side 524*a* of the backlight layer 524. Visible backlight illumination from backlight illumination source 526 that enters the backlight layer 524 is partially reflected by the partially transparent layer 530 to provide sufficient backlighting for the LCD panel 520 so that the image presented thereon is visible when looking at the input surface 510*a* of the optical waveguide 510.

In this embodiment, the backlight layer 524 and backlight source 526 are manufactured as a single assembly that is separate from the LCD panel 520. However, as will be appreciated, the backlight layer 524, backlight source 526 and LCD panel 520 can be integrated and manufactured as one assembly if desired.

Figure 2:
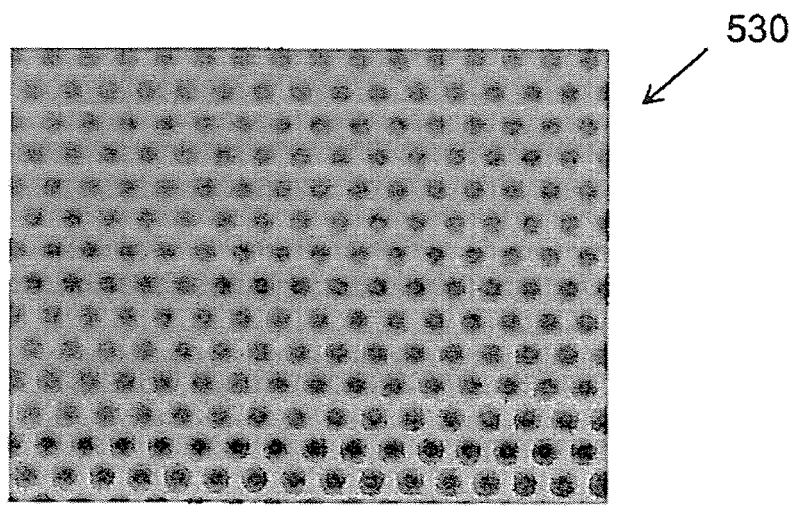
FIG. 2 shows a partially transparent layer in top plan forming part of the interactive input system of FIG. 1.

The partially transparent layer 530 beneath the backlight layer 524 is designed to reflect a certain percentage of visible backlight illumination impinging thereon towards the LCD panel 520 to provide the LCD panel 520 with a reasonable level of backlighting but also to allow a certain percentage of illumination impinging thereon to pass therethrough. In this embodiment, the partially transparent layer 530 comprises a self-adhesive, polyvinylchloride (PVC) film having an array of perforations formed therein as shown in FIG. 2. The size and density of the perforations are selected so that approximately 35% of the film is removed as a result of the perforations.

A general purpose computing device 560 executing one or more application programs communicates with the imaging device 550 and the LCD panel 520. In this embodiment, the computing device 560 comprises for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computing device components to the processing unit. The computing device 560 may also comprise networking capabilities using Ethernet, WiFi, and/or other network formats, for connection to access shared or remote drives, one or more networked computers, or other networked devices.

In general, during operation, image data generated by the computing device 560 is conveyed to the LCD panel 520 which in response presents an image. At the same time, backlight illumination source 526 directs or couples visible backlight illumination into the backlight layer 524. The reflective characteristic of the partially transparent layer 530 ensures that an appropriate amount of backlight illumination entering the backlight layer 524 is reflected towards the LCD panel 520 thereby to provide the LCD panel 520 with the backlighting required for the image presented thereby to be visible through the optical waveguide 510 with the desired degree of resolution when looking at the input surface 510*a*. The IR illumination source 512 also directs or couples IR illumination into the optical waveguide 510 that propagates and remains trapped within the optical waveguide 510 as a result of total internal reflection. The imaging device 550 which is aimed at the support layer 540 is conditioned to capture image frames at a suitable frame rate.

When a pointer, such as a finger F or other suitable object contacts the input surface 510*a* of the optical waveguide 510, IR illumination trapped within the optical waveguide undergoes frustrated total internal reflection (FTIR) at the touch point due to the change in the index of refraction of the optical waveguide 510 at the touch point and escapes from the optical waveguide 510 in a direction generally perpendicular to the plane the optical waveguide 510. The escaping IR illumination reflects off the pointer and scatters downward through the optical waveguide 510. The escaping IR illumination then passes through the LCD panel 520 and the backlight layer 524. At least some of the IR illumination also passes through the partially transparent layer 530, the transparent support layer 540 and the IR pass filter (not shown) on the imaging device 550 and is captured in image frames acquired by the imaging device 520. This occurs for each pointer in contact with the input surface 510*a* of the optical waveguide 510. Thus, image frames captured by the imaging device 520 comprise one or more bright points corresponding to respective touch points made on the input surface 510*a*. When no pointer contacts are made on the input surface 510*a*, the IR illumination propagating within the optical waveguide 510 remains trapped and thus, the imaging device 550 captures dark image frames.

The computing device 560 receives the captured image frames from the imaging device 520 and processes each image frame to determine if the image frame comprises one or more bright spots. If the image frame does not have any bright spots therein, it is determined that no pointer contacts have been made on the input surface 510*a* and the image frame is discarded. If however, the image frame comprises one or more bright spots, the computing device 560 further processes the image frame to determine the coordinates and characteristics of each bright spot in the captured image frame as described in U.S. Patent Application Publication No. 2010/0079409 to Sirotich, et al., assigned to SMART Technologies ULC, the entire disclosure of which is incorporated herein by reference. The determined bright spot coordinates and characteristics are then used by the computing device 560 to update the image data conveyed to the LCD panel 520, if appropriate, so that the image presented by the LCD panel 520 is updated to reflect pointer activity. In this manner, pointer contacts on the input surface 510*a* can be used to inject digital ink into a displayed application, manipulate displayed graphic objects and/or control one or more applications programs executing on the computing device 560.

Figure 3:
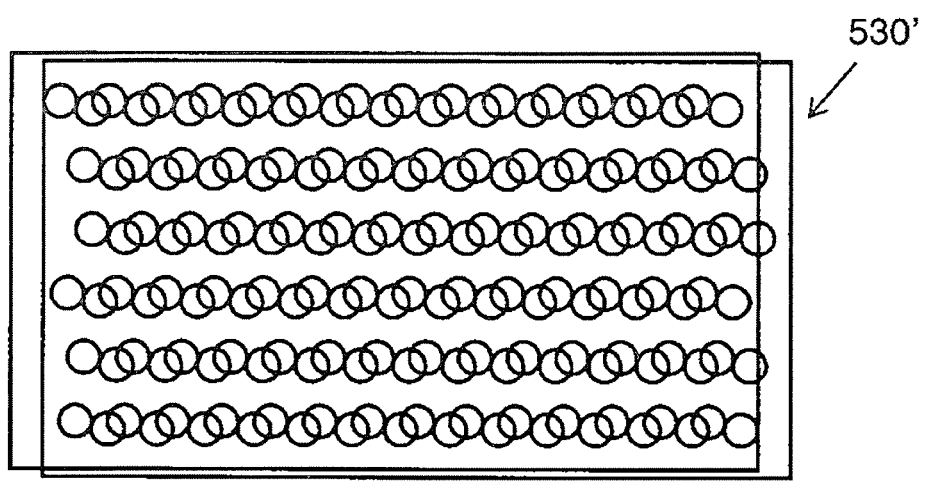
FIG. 3 is a schematic top plan view of an alternative partially transparent layer for use in the interactive input system of FIG. 1.

In the above embodiment, although the partially transparent layer 530 is described as being a film having perforations with a size and density so that 35% of the film is removed, those of skill in the art will appreciate that the size and density of the perforations may be varied to suit the particular environment in which the interactive input system is deployed. Also, the partially transparent layer 530 need not comprise a single perforated film. Rather, the partially transparent layer 530 may comprise multiple perforated films to adjust the reflectivity vs. transparency ratio of the partially transparent layer 530 and make the partially transparent layer more or less reflective. For example, to adjust the reflectivity vs. transparency ratio, multiple perforated films can be placed on top of each other, creating a partially transparent layer 530 that is less transparent, and more reflective. FIG. 3 shows a partially transparent layer 530' comprising two perforated overlapping films. In this case, the perforations in the two films only partially align giving the resulting layer 530' a greater reflective characteristic. By controlling the size, density and alignment of the perforations, the desired reflectivity vs. transparency ratio can be obtained.

Figure 4:
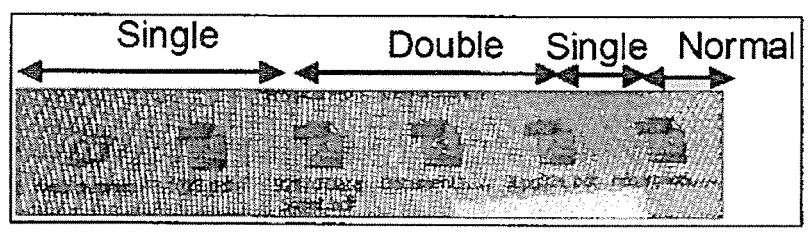
FIG. 4 shows images presented by various interactive input systems.

FIG. 4 shows images of the optical waveguide 510 taken from above and looking at the input surface of the optical waveguide where different backlighting configurations are employed. The image on the right designated as "normal" shows an image presented on an LCD panel that is disposed on a conventional backlighting arrangement (i.e., a backlight layer and a reflective layer rather than a partially transparent layer). The images designated as "single" are presented on the LCD panel 520 where a partially transparent layer 530 comprising a single perforated film is positioned below the backlight layer. The image designated as "double" is presented on the LCD panel 520 where a partially transparent layer comprising two overlapping perforated films is positioned below the backlight layer. As will be appreciated, by adjusting the transparency of the partially transparent layer, the interactive input system can maintain good image quality while allowing FTIR multi touch contacts to be captured in image frames acquired by the imaging device 550.

Figure 5:
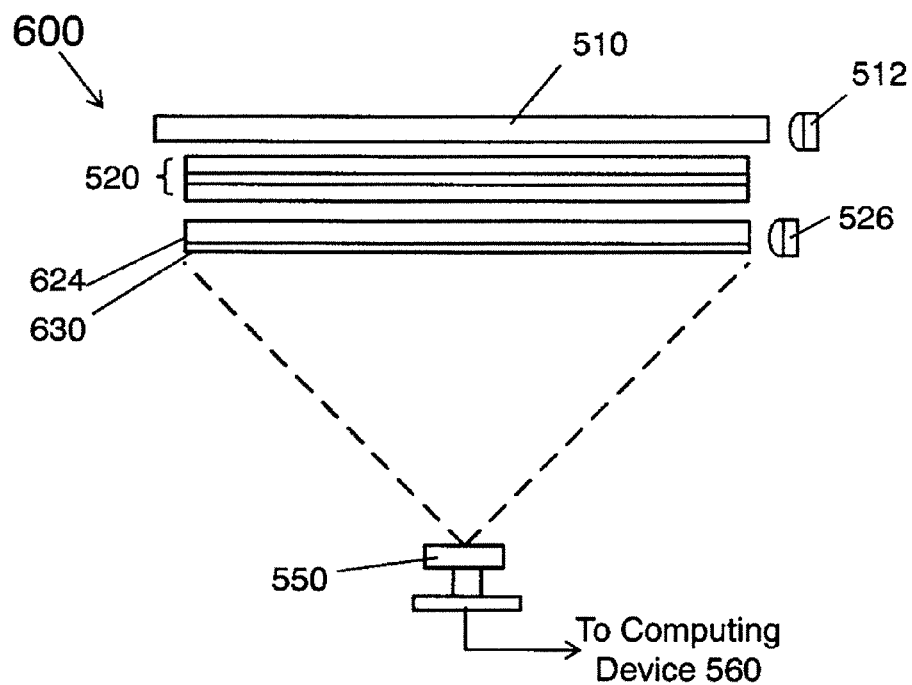
FIG. 5 is a schematic, exploded, side elevational view of yet another embodiment of an interactive input system.

While embodiments have been described above with reference to FIGS. 1 to 4, those of skill in the art will appreciate that alternatives are available. For example, FIG. 5 shows another embodiment of an interactive input system 600 that is very similar to the interactive input system shown in FIG. 1. In this embodiment, the support layer 540 has been removed and the partially transparent layer 630 is attached to the underside of the backlight layer 624. As will be appreciated, by removing the support layer, the weight of the interactive input system 600 is reduced.

Figure 6:
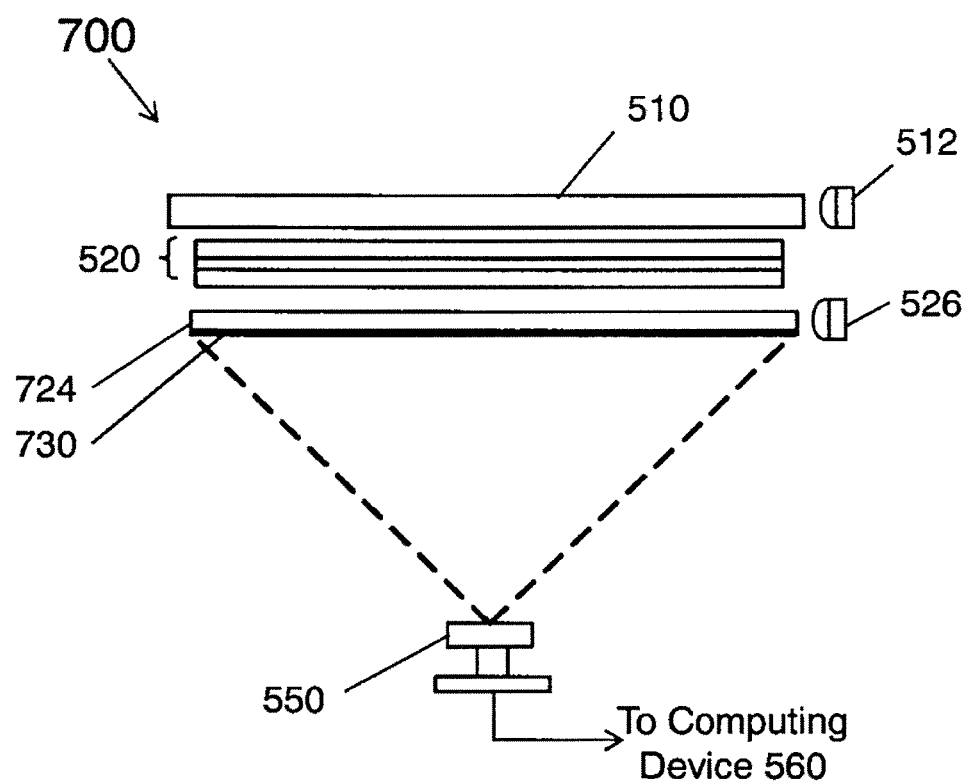
FIG. 6 is a schematic, exploded, side elevational view of another embodiment of an interactive input system.

FIG. 6 shows another embodiment of an interactive input system 700 that again is very similar to the interactive input system shown in FIG. 1. In this embodiment, the support layer 540 has also been removed and the partially transparent layer is in the form of a coating 730 deposited on the underside of the backlight layer 724. The coating 730 performs substantially the same function as the perforated film namely, to reflect a certain percentage of visible backlight illumination back to the LCD panel 520 yet allow a certain percentage of illumination to pass therethrough.

Although the embodiments of FIGS. 1 to 6 show the backlight illumination source 526 positioned along one side of the backlight layer, those of skill in the art will appreciate that backlight illumination sources may be positioned along multiple sides of the backlight layer.

Figure 7:
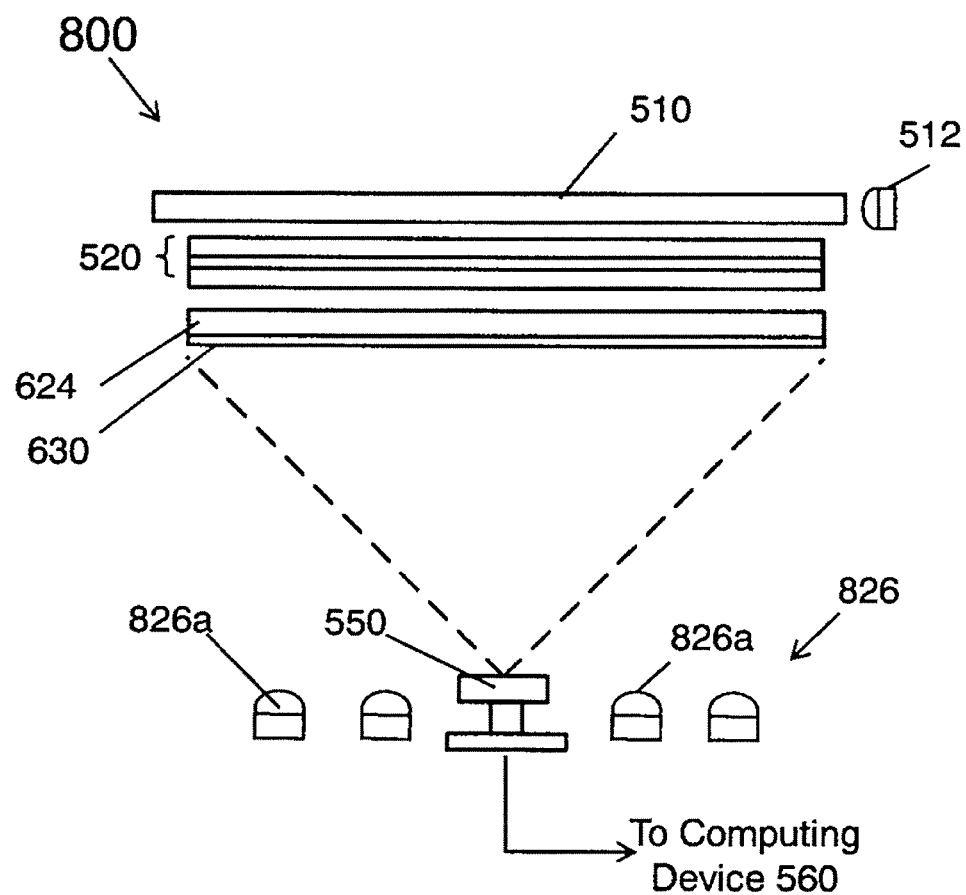
FIG. 7 is a schematic, exploded, side elevational view of yet another embodiment of an interactive input system.

FIG. 7 shows yet another embodiment of an interactive input system 800 that is very similar to the interactive input system of FIG. 5. In this embodiment, rather than placing the backlight illumination source to one or more sides of the backlight layer 630, the backlight illumination source 826 is positioned beneath the partially transparent layer 630. The lighting devices 826a of the backlight illumination source 826 in this case are arranged around the imaging device 550 in a pattern to provide a generally uniform distribution of backlight illumination. Backlight illumination emitted by the backlight illumination source 826 is diffused by and passes through the partially transparent layer 630 and into the backlight layer 624 thereby to provide the LCD panel 520 with suitable backlighting. Those of skill in the art will appreciate that this backlight illumination source configuration may be employed in the embodiments illustrated in FIGS. 1 to 6.

Figure 8:
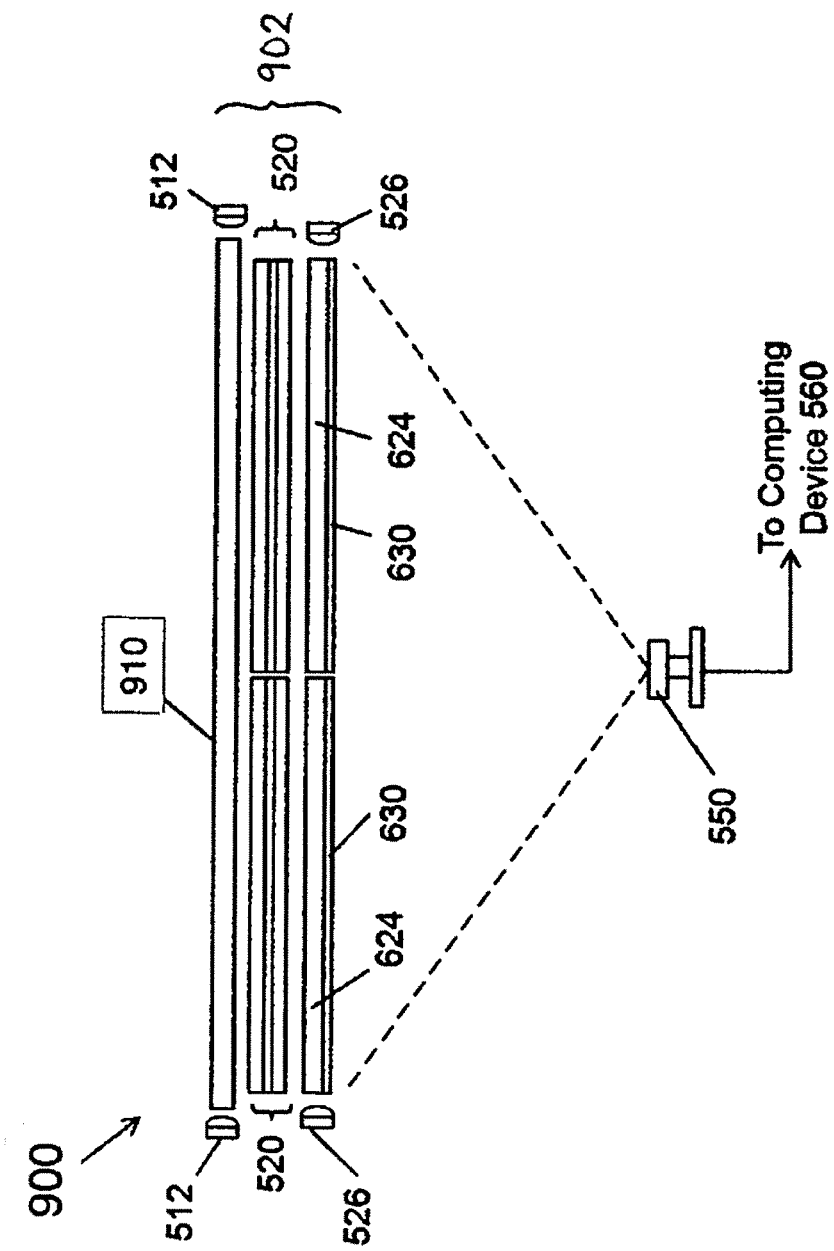
FIG. 8 is a schematic, exploded, side elevational view of yet another embodiment of an interactive input system.
Figure 9:
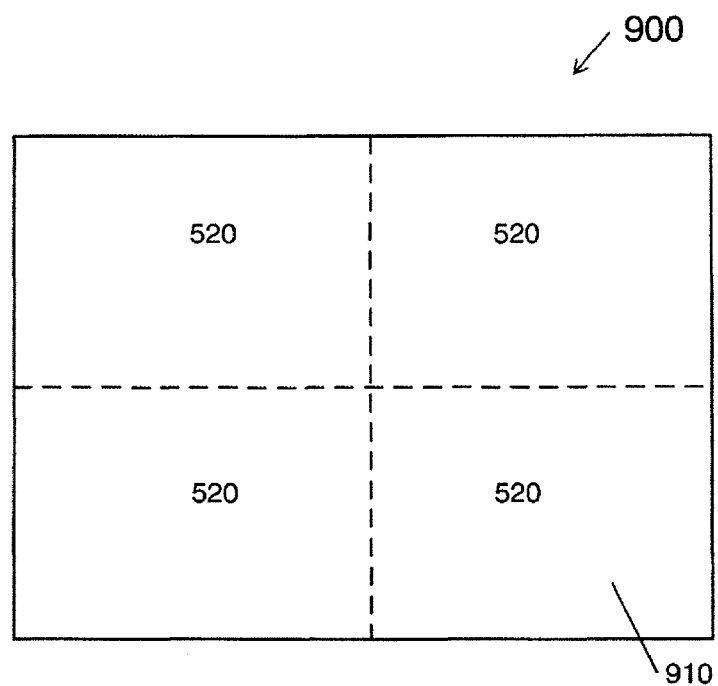
FIG. 9 is a top plan view of the interactive input system of FIG. 8.

FIGS. 8 and 9 show yet another embodiment of an interactive input system 900. In this embodiment, the interactive panel 902 of the interactive input system 900 is of a larger format and comprises an array of abutting LCD panels 520. Those of skill in the art will however appreciate that the interactive panel 902 may comprise more or fewer LCD panels arranged in a variety of configurations. In this embodiment, a backlight layer 624 having a partially transparent layer 630 attached to the underside thereof is provided beneath each LCD panel 520. A backlight illumination source 526 is also positioned along one or more sides of each backlight layer 624. A single optical waveguide 910 is disposed over the array of the LCD panels 520. IR illumination sources 512 are positioned adjacent opposite sides of the optical waveguide 910. A single imaging device 550 having a field of view encompassing all of the partially transparent layers 630 is provided.

Figure 10:
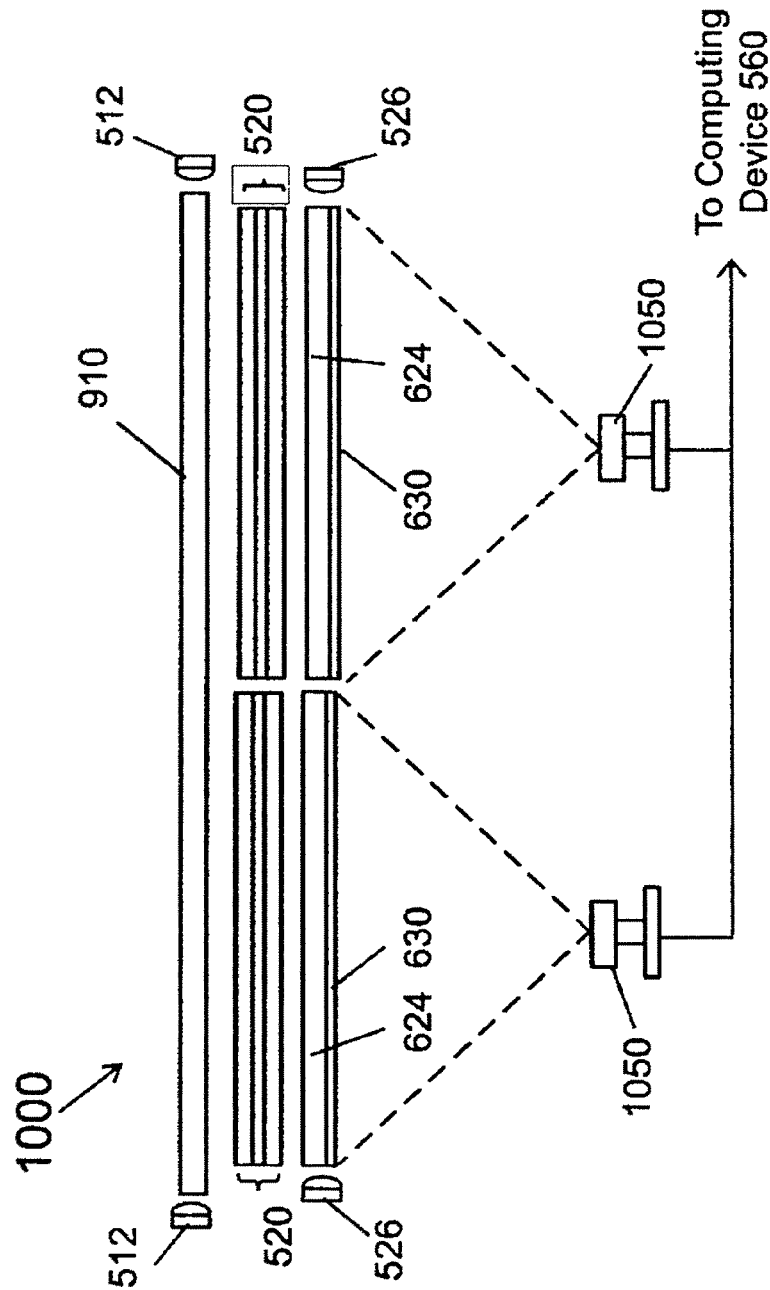
FIG. 10 is a schematic, exploded, side elevational view of yet another embodiment of an interactive input system.

FIG. 10 shows yet another alternative embodiment of an interactive input system 1000 very similar to that illustrated in FIGS. 8 and 9. In this embodiment, multiple imaging devices 1050 are employed with each imaging device having a field of view encompassing a respective partially transparent layer 630.

Figure 11:
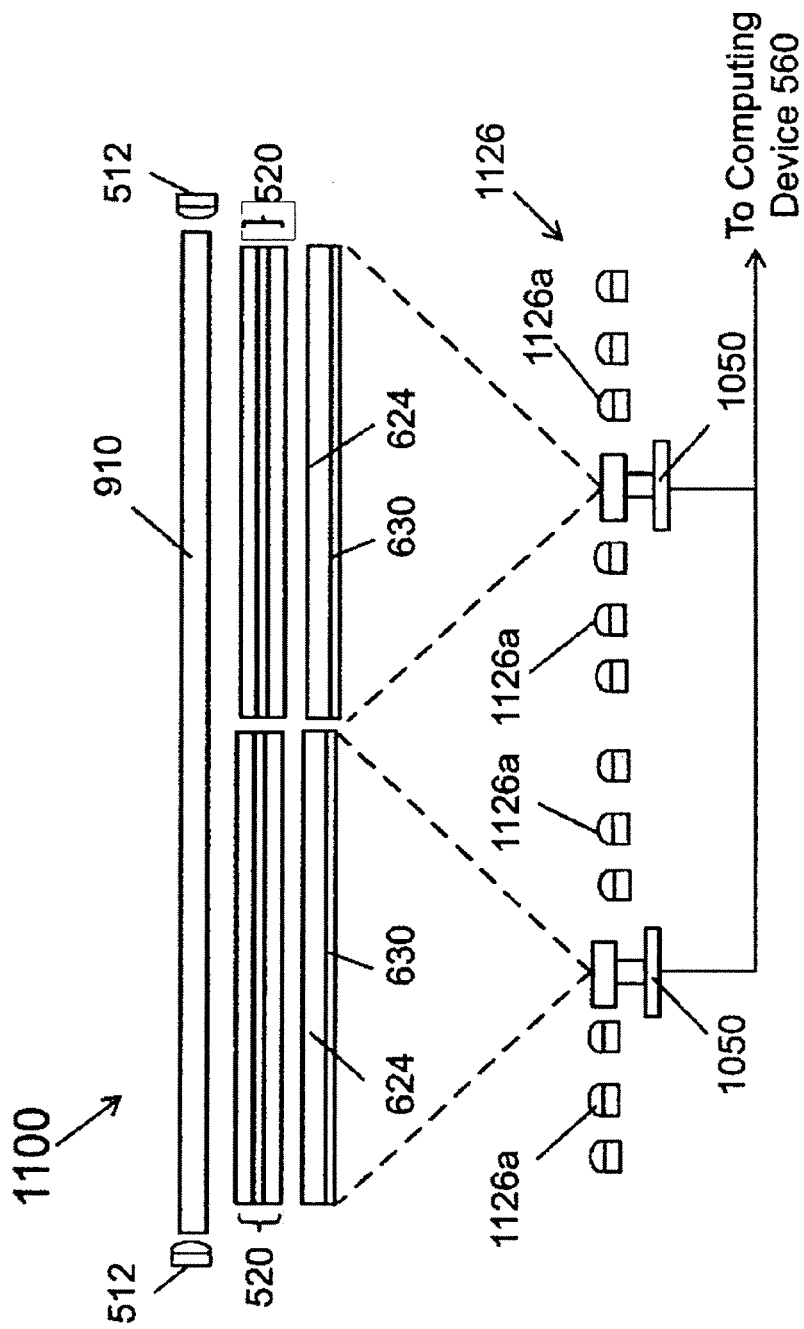
FIG. 11 is a schematic, exploded, side elevational view of still yet another embodiment of an interactive input system.

FIG. 11 shows still yet another alternative embodiment of an interactive input system 1100 similar to that illustrated in FIG. 10. In this embodiment, the backlight illumination sources 1126 are positioned beneath the partially transparent layers 630. The lighting devices 1126a of each backlight illumination source 1126 are arranged around a respective one of the imaging devices 1050. Those of skill in the art will appreciate that this backlight illumination source configuration may of course be employed in the embodiment illustrated in FIGS. 8 and 9. Also, those of skill in the art will appreciate that multiple optical waveguides may be employed in the interactive input systems of FIGS. 8 to 11. For example, a discrete optical waveguide may be disposed over each LCD panel or multiple optical waveguides extending over respective subsets of LCD panels may be employed.

Although the partially transparent layers have been described as a film, multiple films or coating that is/are perforated to achieve the desired reflectivity vs. transparency ratio, those of skill in the art will appreciate that a non-perforated material having the desired reflectivity vs. transparency characteristics may alternatively be employed. If desired, the optical waveguides may coated with scratch-resistance and/or other protective layers. Illumination sources emitting illumination of a different wavelength than IR illumination that can be coupled into the optical waveguides and totally internally reflected therein may also be employed.

Also, although exemplary materials for various layers of the interactive input systems have been described, those of skill in the art will appreciate that other suitable materials may be used. Furthermore, although the display panels are described as being LCD panels, those of skill in the art will appreciate that other generally transparent or partially transparent display devices may be employed.

Although embodiments have been described, those of skill in the art will appreciate that variations and modifications may be made without departing from the scope thereof as defined by the appended claims.

What is claimed is:

1. An interactive panel comprising:
   an optical waveguide within which totally internally reflected (TIR) illumination propagates;
   a display device beneath said optical waveguide; and
   a partially transparent layer beneath said display device, said partially transparent layer reflecting backlight illumination towards said display device and at least allowing TIR illumination escaping from said optical waveguide and passing through said optical waveguide and display device, as a result of one or more contacts made on said optical waveguide, to pass therethrough, wherein said partially transparent layer comprises overlapping perforated films, the perforations in the films partially aligning.

2. The interactive panel according to claim 1 further comprising a backlight layer between said display device and said partially transparent layer, said backlight layer directing backlight illumination to said display device and said partially transparent layer.

3. The interactive panel according to claim 2 wherein said partially transparent layer is applied to said backlight layer.

4. The interactive panel according to claim 2 further comprising a generally transparent support layer supporting said partially transparent layer.

5. The interactive panel according to claim 1 further comprising an illumination source directing illumination having an optical property different than said backlight illumination into said optical waveguide that is totally internally reflected therein.

6. The interactive panel according to claim 5 wherein said illumination source directs infrared (IR) illumination into said optical waveguide.

7. The interactive panel according to claim 2 further comprising an illumination source directing illumination having an optical property different than said backlight illumination into said optical waveguide that is totally internally reflected therein.

8. The interactive panel according to claim 7 wherein said illumination source directs infrared (IR) illumination into said optical waveguide.

9. The interactive panel according to claim 2 further comprising a backlight illumination source directing backlight illumination into said backlight layer.

10. The interactive panel according to claim 7 further comprising a backlight illumination source directing backlight illumination into said backlight layer.

11. The interactive panel according to claim 1 wherein said display device is a liquid crystal display (LCD) panel.

12. The interactive panel according to claim 2 wherein said display device is a liquid crystal display (LCD) panel.

13. The interactive panel according to claim 5 wherein said display device is a liquid crystal display (LCD) panel.

14. The interactive panel according to claim 7 wherein said display device is a liquid crystal display (LCD) panel.

15. An interactive input system comprising:
   an interactive panel comprising:
      a single optical waveguide within which totally internally reflected (TIR) illumination propagates;
      a plurality of display devices beneath said optical waveguide; and
      a partially transparent layer beneath each display device, each said partially transparent layer reflecting backlight illumination towards said display device and at least allowing TIR illumination escaping from said optical waveguide and passing through said optical waveguide and display device, as a result of one or more contacts made on said optical waveguide, to pass therethrough, wherein each partially transparent layer comprises overlapping perforated films, the perforations in the films partially aligning; and
   at least one imaging device capturing image frames comprising TIR illumination passing through each said partially transparent layer.

16. The interactive input system according to claim 15 further comprising processing structure processing image frames captured by said at least one imaging device to detect contacts made on said optical waveguide.

17. The interactive input system according to claim 16 wherein said processing structure further provides image data to said plurality of display devices.

18. The interactive input system according to claim 17 further comprising a backlight layer between each display device and respective partially transparent layer, each backlight layer directing backlight illumination to said respective display device and respective partially transparent layer.

19. The interactive input system according to claim 18 wherein each partially transparent layer is applied to said respective backlight layer.

20. The interactive input system according to claim 19 further comprising a generally transparent support layer supporting each partially transparent layer.

21. The interactive input system according to claim 17 further comprising an illumination source directing illumination having an optical property different than said backlight illumination into said optical waveguide that is totally internally reflected therein.

22. The interactive input system according to claim 21 wherein said illumination source directs infrared (IR) illumination into said optical waveguide.

23. The interactive input system according to claim 18 further comprising at least one backlight illumination source directing backlight illumination into said backlight layers.

24. The interactive input system according to claim 23 comprising a plurality of backlight illumination sources directing backlight illumination into said backlight layers.

25. The interactive input system according to claim 15 comprising a plurality of imaging devices, each imaging device capturing image frames comprising TIR illumination passing through a respective subset of partially transparent layers.

26. The interactive input system according to claim 15 wherein each display device is an LCD panel.

27. The interactive input system according to claim 25 wherein each display device is an LCD panel.

28. An interactive panel comprising:
   an optical waveguide within which totally internally reflected (TIR) illumination propagates;
   a plurality of display panels beneath said optical waveguide; and
   at least one partially transparent layer beneath said display panels, said at least one partially transparent layer reflecting backlight illumination towards said display panels and allowing TIR illumination escaping from said optical waveguide and passing through said optical waveguide and one or more of said display panels, as a result of one or more contacts made on said optical waveguide, to pass therethrough, wherein said at least one partially transparent layer comprises overlapping perforated films, the perforations in the films partially aligning.

29. The interactive panel according to claim 27 comprising a plurality of partially transparent layers, each partially transparent layer positioned beneath a respective one of said display panels.

30. An interactive input system comprising:
- an interactive panel comprising:
  - an optical waveguide within which totally internally reflected (TIR) illumination propagates;
  - a plurality of display panels beneath said optical waveguide; and
  - at least one partially transparent layer beneath said display panels, said at least one partially transparent layer reflecting backlight illumination towards said display panels and allowing TIR illumination escaping from said optical waveguide and passing through said optical waveguide and one or more of said display panels, as a result of one or more contacts made on said optical waveguide, to pass therethrough, wherein said at least one partially transparent layer comprises overlapping perforated films, the perforations in the films partially aligning; and
- at least one imaging device capturing image frames comprising TIR illumination passing through each said partially transparent layer.

* * * * *